UNITED STATES PATENT OFFICE.

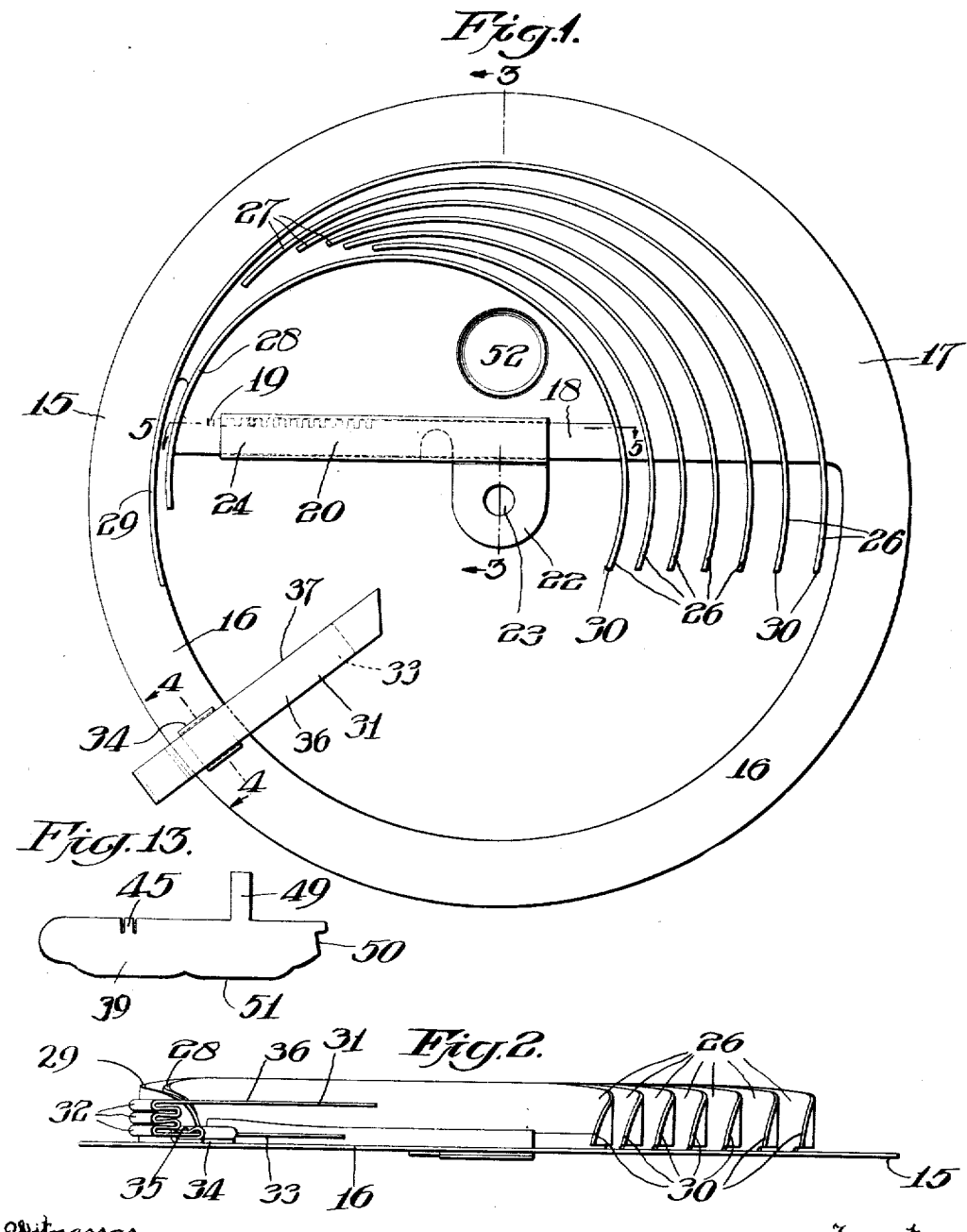

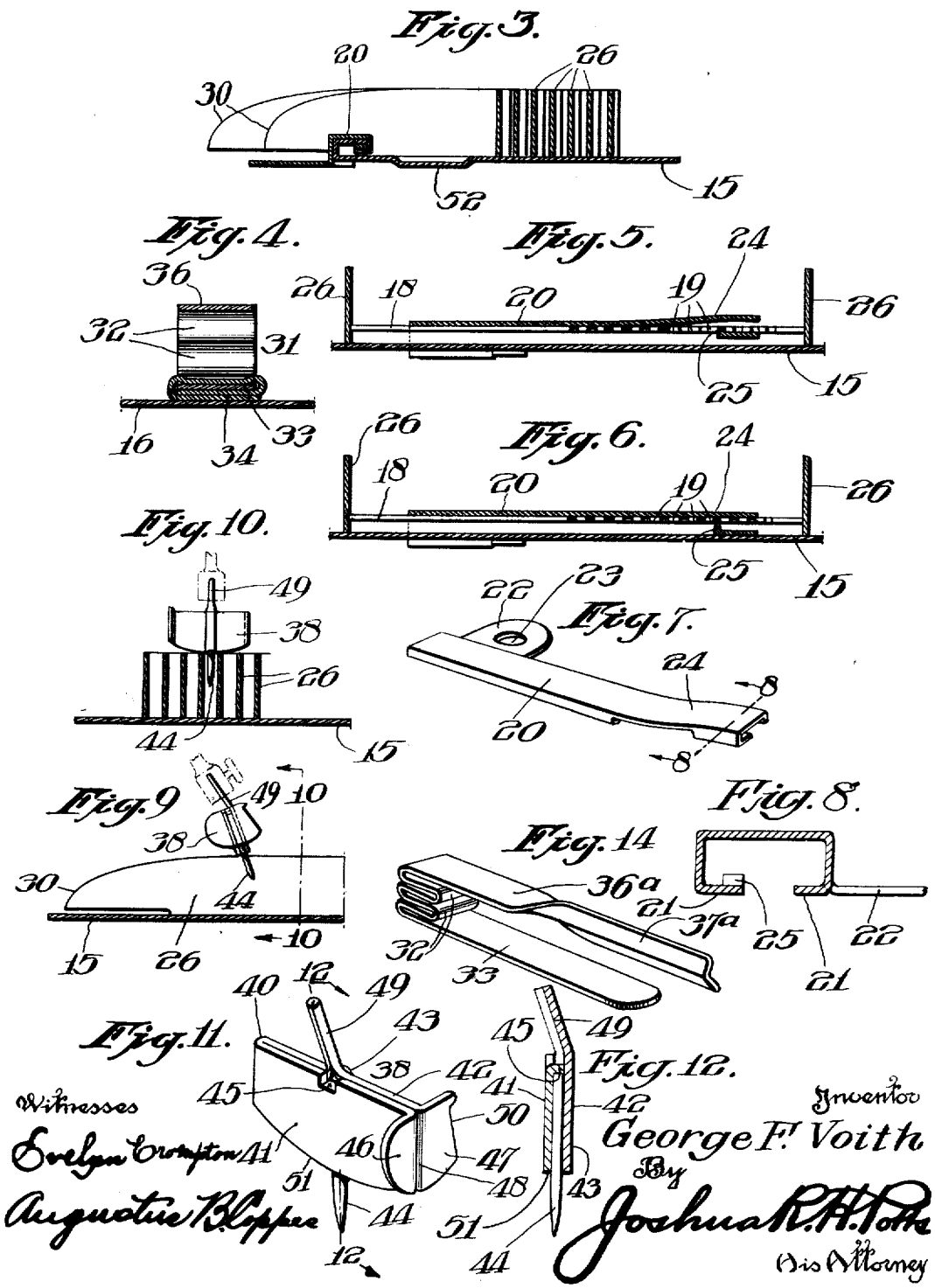

GEORGE F. VOITH, OF PHILADELPHIA, PENNSYLVANIA.

REPEATING DEVICE FOR TALKING-MACHINES.

1,349,240. Specification of Letters Patent. Patented Aug. 10, 1920.

Application filed June 20, 1919. Serial No. 305,512.

*To all whom it may concern:*

Be it known that I, GEORGE F. VOITH, a citizen of the United States, residing at Philadelphia, in the county of Philadelphia and State of Pennsylvania, have invented certain new and useful Improvements in Repeating Devices for Talking-Machines, of which the following is a specification.

My invention relates to repeating devices of the general type covered in my United States Patent No. 1,248,041, dated November 27, 1917.

One object of my present invention is to provide an improved repeating device of the above type which can be quickly and cheaply manufactured and which will be of a simplified construction.

Another object is to so construct my present invention that reproducing needles of any of the well known types can be used in connection therewith.

These objects, and other advantageous ends which will be described hereinafter I attain in the following manner reference being had to the accompanying drawings in which—

Figure 1 is a top plan view of a repeating device constructed in accordance with my invention, Fig. 2 is a front elevation of Fig. 1, Fig. 3 is a section taken on the line 3—3 of Fig. 1, Fig. 4 is a section taken on the line 4—4 of Fig. 1, Fig. 5 is a section taken on the line 5—5 of Fig. 1, Fig. 6 is a section of similar nature to that shown in Fig. 5 showing the coupling member having been moved into a position to permit adjustment of the device to suit records of various sizes, Fig. 7 is a perspective view of my improved coupling member, Fig. 8 is an enlarged section through the coupling member and taken on the line 8—8 of Fig. 7, Fig. 9 is a fragmentary sectional elevation showing a portion of my invention, Fig. 10 is a transverse section taken on the line 10—10 of Fig. 9, Fig. 11 is a perspective view showing needle holding and guiding portions of my invention, Fig. 12 is a section taken on the line 12—12 of Fig. 11, Fig. 13 is a developed view of the needle holding and guiding means showing how the same is cut or stamped from a piece of sheet spring steel, and Fig. 14 is a perspective view showing a modified form of needle holding or checking means which forms a part of my invention.

Referring to Figs. 1 to 13 inclusive, my invention consists of a circular plate 15 which is preferably made of sheet material, such as metal, celluloid or the like, and includes a ring section 16 and a solid section 17. The solid section has a turned or folded edge or flange 18 which has teeth 19 cut therein in the form of a toothed rack. A coupling member 20, which can be made of sheet metal as illustrated in Figs. 1, 2, 3, 5, 6 and 7, has a portion 21 which embraces the turned edge 18. An ear 22 projects from the portion 21 and includes a hole 23 through which the center post of the turntable of any type of talking machine is adapted to project; it being noted that the plate 15 is adapted to be placed upon a record as set forth in my above mentioned patent. The end portion 24 of the coupling member 20 opposite the ear 22 is resilient and normally raised. This portion includes a lug 25 which is adapted to enter between the teeth 19 so as to prevent the coupling member from sliding longitudinally along the turned edge 18. By pressing downward on the end portion 24, the lug 25 will be moved out of engagement with the teeth 19 as shown in Fig. 6, and the coupling member can be moved longitudinally along the turned edge 18 of the turntable so as to change the position of the hole 23 relatively to the center of the plate 15 for using the device on records of different diameters. The solid portion 17 of the plate 15 provides a support for a plurality of transfer rails 26, said rails being soldered or otherwise suitably secured throughout a portion of their length to the solid portion 17. These rails are preferably made of thin resilient material, such as metal, and their inner ends 27 being freely movable in a plane parallel with the upper surface of the plate 15. One of the rails as indicated at 28 projects beyond the turned edge 18 and another of the rails 29 extends beyond the adjacent end of the rail 28. These rails 28 and 29 are positioned close together at one side of the plate and are widely separated at the opposite side of the plate so as to permit the remaining rails 26 to be positioned therebetween, as clearly illustrated in Fig. 1. The rails 26 project into the ring section 16 and slant or flare upwardly from their ends 30, as clearly shown in Figs. 2, 3 and 9.

A slidable stop 31 consists of a strip of resilient metal which has convolutions 32 formed therein between its ends, as clearly shown in Fig. 2. The lower section 33 of the stop 31 is slidably mounted in a bearing 34, said bearing being secured by solder or other suitable means to the ring section 16 of the plate 15. Said bearing consists of a folded strip of metal having its top portion 35 depressed so as to frictionally bind the section 33 to guard against accidental slipping movement of said section 33, but permitting said section 33 to be manually slid through the bearing 34 for a purpose hereinafter described. The upper section 36 of the slidable stop 31 is substantially parallel with the section 33 and extends into the ring section 16 so that the edge 37 of the section 36 is substantially radial with the center of the plate 15.

A needle holder and guide 38 is made by cutting or stamping a blank, such for example as a blank shown at 39 in Fig. 13. This needle holder and guide is preferably made from sheet spring steel and is folded within its length, as shown at 40 so that two sections 41 and 42 are provided, as clearly illustrated in Figs. 11 and 12. The section 42 has a bulge 43 pressed therein to permit the insertion of a reproducing needle 44. The section 41 has a flange 45 bent therefrom by cutting the blank, as clearly shown in Fig. 13, and afterward bending said flange inwardly to form an abutment or stop for the upper end of the needle 44. The resiliency of the metal serves to hold the sections 41 42 together and thereby clamp the reproducing needle therebetween. The sections 41 and 42 respectively have lips 46 and 47 bent at an angle thereto so that by inserting the end of the finger or finger nail in the parting 48, the two sections can be separated to release the needle 44. The section 42 has a stem 49 formed thereon, said stem being bent from the shape shown in Fig. 13 to the shape shown in Figs. 11 and 12, and this stem can be inserted and secured within the needle holder on any type of sound box. The lip 47 has an angular edge 50 which, during the playing of the record, is adapted to slide against the edge 37 of the slidable stop 31, and as the needle moves inwardly toward the center of the record, the edge 50 will move along the edge 37 until it frees the stop 31, after which the entire plate 15 will take the movement of the record and cause the flared end portions 30 of the rails to engage under the bottom edge 51 of the needle holder and thereby, due to the movement of the plate 15, raise the needle 44 from the record and above the level of the solid portion 17. The rails will serve to guide the needle holder and needle between the adjacent portions of the rails 28 and 29 and will thereby cause the reproducing needle to be again moved away from the center of the record and lowered into engagement with the initial playing groove of the record with the edge 37 of the slidable stop 31 again engaging the edge 50 of the needle holder.

The stop 31 can be moved so that its inner end will occupy various positions with respect to the center of the plate 15 so that if records have reproducing portions of various widths, the inner end of the stop 31 can be positioned so as to be freed of the needle holder after the entire record has been played. The device can be used on records of different diameters by moving the coupling member 20 so as to vary the position of the hole 23 with respect to the ends of the rails.

The solid portion 17 of the plate 15 has a projection 52 which is formed by pressing the solid portion, as clearly shown in Figs. 1 and 3. This projection 52 is made in circular formation and the center of the projection is the balance point of the entire device. For example the entire device will normally rest and balance upon the projection 52.

I preferably coat or cover the parts of my invention, and particularly the needle holder and guide 38, with a coating of paint, shellac or rubber, and when so coated, the parts can be made of metal without producing any undesirable metallic sound during the operation thereof.

By providing the convolutions 32 in the stop 31, the upper section 36 is rendered resilient so that when the plate rotates, after the freeing of the stop 31 with the holder 38, the stop 31 again strikes the holder 38. The top section 36 will slightly yield so as to form a cushion, thereby preventing noise and injury to the parts.

In Fig. 14 I have shown a modified form of stop in which the upper section 36ᵃ is bent at 37ᵃ for engagement with the needle holder and thereby provides an extended bearing for the edge 50 of the needle holder. In all other respects the form of stop shown in Fig. 14 is substantially similar to that previously described in connection with the stop 31.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what

I claim as new and desire to secure by Letters Patent is:—

1. A repeating device of the character described including a plate having a toothed rack; transfer rails on said plate; and a coupling member slidably connected to said plate and having a centering hole therein, said coupling member having a resilient portion providing a lug normally adapted to enter between the teeth of said rack and thereby lock the coupling member to the plate; substantially as described.

2. A repeating device of the character described including a plate; means carried by the plate for transferring a reproducing needle from the finishing to the initial playing grooves of a record; and a balancing projection on the bottom of said plate formed by pressing in the top of said plate; substantially as described.

3. A repeating device of the character described including a plate; needle transferring rails thereon; a bearing supported on said plate; and a stop having a section slidably mounted in said bearing and including folds or convolutions with a section leading inwardly from the outer portion of said plate, said latter section serving as holding means against the action of said needle to prevent the movement of said plate during the reproducing action of said needle upon a record, said folds serving as yieldable shock absorbing means for said latter stop section; substantially as described.

4. A repeating device of the character described including a plate; needle transferring means thereon; a bearing provided on said plate; and a stop having a section slidably mounted in said bearing, said bearing consisting of a folded strip with a depression therein, said stop slidably fitting between the folds and being in engagement with said depressed portion, whereby said depressed portion frictionally holds said slidable section against accidental sliding movement, said stop having a portion extending inwardly from the outer part of said plate; substantially as described.

In testimony whereof I have signed my name to this specification in the presence of two subscribing witnesses.

GEORGE F. VOITH.

Witnesses:
ANNA RENTON,
CHAS. E. POTTS.